United States Patent [19]

Buiter et al.

[11] 4,060,397
[45] Nov. 29, 1977

[54] TWO STAGE PARTIAL COMBUSTION PROCESS FOR SOLID CARBONACEOUS FUELS

[75] Inventors: Pieter Buiter, The Hague; Maarten J. van der Burgt, Akersloot; Henricus J. A. Van Helden, Haariem Resp, all of Netherlands

[73] Assignee: Shell Internationale Research Maatschappij B.V., Netherlands

[21] Appl. No.: 745,244

[22] Filed: Nov. 26, 1976

Related U.S. Application Data

[63] Continuation-in-part of Ser. No. 545,248, Jan. 29, 1975, abandoned.

[30] Foreign Application Priority Data

Feb. 21, 1974  United Kingdom ............... 7903/74

[51] Int. Cl.$^2$ .............................................. C10J 3/00
[52] U.S. Cl. ..................................... 48/197 R; 48/202; 48/210; 48/DIG. 4; 252/373
[58] Field of Search ............... 48/210, 202, 206, 215, 48/197 R, DIG. 4; 252/373; 423/650

[56] References Cited

U.S. PATENT DOCUMENTS

| | | | |
|---|---|---|---|
| 2,886,421 | 5/1959 | Dickinson | 48/206 |
| 3,010,813 | 11/1961 | Clarke et al. | 252/373 |
| 3,620,698 | 11/1971 | Schlinger et al. | 48/206 |
| 3,784,364 | 1/1974 | Slater et al. | 48/215 |

FOREIGN PATENT DOCUMENTS

| | | |
|---|---|---|
| 739,292 | 2/1970 | Belgium. |
| 1,380,842 | 1/1975 | United Kingdom. |
| 725,635 | 3/1955 | United Kingdom. |
| 677,643 | 8/1952 | United Kingdom. |
| 606,765 | 8/1948 | United Kingdom. |
| 306,614 | 2/1929 | United Kingdom. |
| 649,578 | 1/1951 | United Kingdom. |

*Primary Examiner*—Robert L. Lindsay, Jr.
*Assistant Examiner*—George C. Yeung
*Attorney, Agent, or Firm*—Pravel, Wilson & Gambrell

[57] ABSTRACT

An improved process for the production of a soot-free hydrogen and carbon monoxide-containing gas by non-catalytic partial combustion of a carbonaceous fuel is described. In this process high yields of hydrogen and carbon monoxide are obtained by staging the partial combustion reaction in a manner such that a substantial portion, e.g., up to 95%, of the carbonaceous fuel charge to the process is reacted with diluted oxygen in a first reaction zone maintained at 1200° to 1700° C to form a first reaction zone effluent made up principally of hydrogen and carbon monoxide and this first reaction zone effluent is passed into a second reaction zone maintained at a temperature at least 100° C lower than the first reaction zone wherein the remaining carbonaceous material is substantially completely converted to gaseous partial combustion products.

1 Claim, No Drawings

TWO STAGE PARTIAL COMBUSTION PROCESS FOR SOLID CARBONACEOUS FUELS

CROSS-REFERENCE TO RELATED APPLICATIONS

This application is a continuation-in-part application of Application Ser. No. 545,248, filed Jan. 29, 1975, now abandoned and claims the priority date of Application No. 7903/74 filed in Great Britian on Feb. 21, 1974.

BACKGROUND OF THE INVENTION

The invention relates to the production of hydrogen and carbon monoxide-containing gas from carbonaceous fuels. More particularly the invention is directed to a two stage partial combustion process affording increased yields of CO and $H_2$ which is especially applicable to conversion of finely dispersed solid carbonaceous fuels such as coal or coke.

In the chemical and energy providing industries there is a great demand for gas containing substantial amounts of $H_2$ and/or CO in various mixtures and purities. Such gas may be used, for instance, as a starting material for the manufacture of chemical products — e.g., ammonia, alcohols, etc., — as a reducing agent, as a clean fuel or in hydrogenation processes. A well-known and widely employed method for the preparation of such a gas is the partial combustion of carbonaceous fuels in a substantially void or hollow reactor. As a general matter, prior efforts to optimize this partial combustion process have concentrated on reactor designs and reactant mixing procedures and devices wherein gaseous or finely dispersed carbonaceous fuel is reacted with oxygen diluted with nitrogen and/or steam in a single reaction stage or zone. Despite the several advances made in this area of technology, the utilization of such single stage partial combustion processes is still not considered to be entirely satisfactory because the high temperatures required for carrying out the reaction in a single stage generally result in a high oxygen consumption which in turn leads to a relatively low yield of CO and $H_2$. Other two stage processes require that the solid carbonaceous fuels be introduced in the form of a slurry usually with other liquid hydrocarbons. This has been found to cause soot to form and contaminate the product gases.

The present invention seeks to maximize the yield of usable CO and $H_2$ obtained from the partial combustion of solid carbonaceous fuels by carrying out the partial combustion reaction in two stages, and, at the same time, minimize the amount of soot formed. Staged partial combustion processes have been previously proposed, e.g., see U.S. Pat. No. 2,886,421. However, in the staged partial combustion process described in that patent, the primary purpose of the second stage combustion is to supply heat to the first stage of the process and as a result the second stage is maintained at a temperature substantially the same or higher than the first stage.

SUMMARY OF THE INVENTION

It has now been found that the yield of CO and $H_2$ in the non-catalytic partial combustion of carbonaceous fuels can be increased by carrying out the combustion in two stages provided the average temperature of the second reaction stage is substantially lower than that of the first reaction stage. Accordingly, in its broadest aspects the instant invention is directed to a process for the production of a substantially soot-free hydrogen and carbon monoxide-containing gas by partial combustion of a carbonaceous fuel which comprises a. partially combusting a solid carbonaceous fuel, without introducing such solid fuel in the form of a slurry, by reaction with diluted oxygen in a first reaction zone maintained at 1200° to 1700° C to form a reaction zone effluent wherein up to 95% of the carbonaceous fuel charge to the process is converted to a gaseous partial combustion product made up principally of hydrogen and carbon monoxide, and b. passing the reaction zone effluent from the first reaction zone into a second reaction zone maintained at an average temperature at least 100° C lower than that of the first reaction zone wherein the remaining carbonaceous fuel is substantially completely converted to a partial combustion reaction product made up principally of hydrogen and carbon monoxide and substantially free of soot. Preferably from about 70 to about 90% of the carbonaceous fuel introduced into the first reaction zone is converted to partial oxidation products prior to passage of the first reaction zone effluent to the second reaction zone.

DETAILED DESCRIPTION OF THE INVENTION

As a feedstock for the present process, any solid carbonaceous fuel can be used without incorporating such fuel into a slurry. In this specification by a solid carbonaceous fuel is meant any combustible material consisting for a substantial part of carbon. The fuel may contain oxygen, hydrogen, sulfur and/or nitrogen. Such a feedstock includes, e.g., lignite, anthracite, bituminous coal, coke, or the like. The solid feedstock should be in a powdered form so that it can readily react with oxygen in the first reaction zone. Preferably, the size of solid carbonaceous fuel has been reduced such that 70% of the fuel has a particle size smaller than 200 mesh.

The oxidant includes air and oxygen diluted with steam, carbon dioxide, nitrogen and/or argon. Advantageously, the oxidant is preheated before it is reacted with the carbonaceous fuel. The preheating of the oxidant is suitably carried out indirectly by heat exchange with any heat source, e.g., the hot product gas obtained in the present process. The oxidant is preferably preheated to a temperature in the range of from 200° to 1300° C, depending on the type oxidant. After the preheating, the hot oxidant is advantageously mixed with the unslurried solid carbonaceous fuel and the oxidant/fuel mixture is introduced, preferably as a jet, into the first reaction zone.

As indicated above, a substantial portion, i.e., up to about 95%, of the carbonaceous fuel charge to the process is converted to partial oxidation products in the first reaction zone. For maximum yields of usable gas (CO and $H_2$), the conversion of carbonaceous fuel fed to the process in the first reaction zone is preferably in the range of about 70 to about 90%. Under these conditions an approximate 10% decrease in oxygen consumption and approximately 3 to 10% increase in yield of CO plus $H_2$ over conventional one-stage processes can be realized. Accordingly, the O/C ratio (atomic ratio of total oxygen excluding chemically bound oxygen in, for example, steam, to total carbon in the feed) preferably ranges from about 0.9 to about 1.4 for carbonaceous fuels, e.g., finely divided coals, typically employed in the process of the invention.

In one embodiment of the present process the amount of fuel to be introduced in the first reaction stage is preferably 50 to 95% of the total amount of fuel to be gasified and the remainder of the fuel is introduced either in the first stage effluent or directly into the second reaction zone.

In another embodiment the total amount of fuel is introduced into the first reaction zone and the residence time is chosen such that the fuel in only partly converted to the desired product, e.g., up to 95% conversion, the conversion to the desired product being substantially completed in the second reaction zone.

The first reaction zone preferably consists of a void steel vessel, the inside of which has been lined with refractory material.

The partial combustion in the first reaction zone is suitably carried out at a temperature in the range of from 1200° to 1700° C, which temperature results from the reaction of the carbonaceous fuel with the oxidant.

The pressure maintained in the first reaction zone may vary within wide limits and is advantageously kept in the range of from 1 to 200 kg/cm$^2$ absolute.

In a preferred embodiment the mixture of oxidant and carbonaceous fuel is introduced into the first reaction zone at a high velocity. A suitable linear introduction velocity is in the range of from 10 to 200 m/sec.

In order to convert a substantial portion of the carbonaceous fuel which is introduced into the first reaction zone into a product gas, the solid particles should remain therein for a certain residence time. It has been found that the residence time of the reactants is advantageously chosen in the range of from 0.02 to 20 seconds. The residence time is relatively short (preferably 0.02–3 seconds) in the case the total fuel to be gasified is introduced into the first reaction zone. The residence time is relatively long (preferably 0.5–20 seconds) if only part of the fuel to be gasified is introduced into the first reaction zone.

After at least a substantial part of the carbonaceous material has been converted to gas, the reaction product, mainly consisting of $H_2$, CO, $N_2$, $CO_2$ and $H_2O$, is withdrawn from the first reaction zone and introduced into the second reaction zone. In case only part of the carbonaceous material to be gasified is introduced into the first reaction zone, the remaining part of the carbonaceous material is introduced, preferably together with steam, nitrogen and/or $CO_2$, into the effluent of the first reaction zone and/or the second reaction zone. The amount of fuel to be introduced into the first reaction zone effluent is preferably 5 to 50% of the total amount of fuel to be gasified to hydrogen and carbon monoxide. The amount of steam, nitrogen and/or $CO_2$ which is introduced together with the remaining part of the fuel into the first reaction zone effluent is preferably in the range of from 1/10 to 2 Nm$^3$ per kg fuel. This diluent gas advantageously has a pressure in the range of from 2 to 210 kg/cm$^2$ absolute and a temperature in the range of from 100° to 700° C. The mixture of first reaction zone effluent and optionally of the remaining part of the fuel, together with steam, $CO_2$ and/or $N_2$, is then passed to a second reaction zone where carbonaceous material is substantially completely converted with the $CO_2$ and/or the steam into carbon monoxide and hydrogen, leaving the effluent gas substantially free of soot. This conversion is carried out at a temperature which is at least 100° C lower than that of the first stage and is preferably in the range of from 600° to 1400° C. The pressure may be atmospheric or superatmospheric, pressures up to 200 kg/cm$^2$ absolute being suitable.

This second reaction zone preferably consists of a void steel vessel, the inner walls of which are lined with refractory material. The capacity of the second reaction zone should be great enough to provide a residence time for the reactants which is sufficiently long to convert the remaining part of the fuel substantially completely into gaseous partial combustion components. This residence time is preferably in the range of from 0.5 to 40 seconds.

After the conversion has been terminated, the ultimate gaseous reaction product is withdrawn from the second reaction zone. This reaction product has a temperature in the range of from 600° to 1400° C. The dry gaseous reaction product has the following compositions:

|  | % vol |
|---|---|
| CO | 10–70 |
| $H_2$ | 5–50 |
| $CO_2$ | 0.01–20 |
| $CH_4$ | 0.01–20 |
| $N_2$+A | 0.1–75 |
| $H_2S$ | 0–4 |

The invention will now be further demonstrated by means of the following Examples illustrative of, rather than restrictive of, the scope of the process of the invention.

EXAMPLE I

As a feedstock, coal was used having the following composition:

|  | % wt |
|---|---|
| C | 73.7 |
| H | 5.1 |
| O | 8.8 |
| S | 0.9 |
| N | 1.6 |
| ash | 9.9 |

This coal contained 33.8 wt. % volatile components and 2.6 wt. % water. It was ground to a powder, 70% of which could pass a sieve of 200 mesh.

One thousand twenty-eight kg of the coal were mixed with 858 kg of an oxidizing gas containing 98.9 wt. % $O_2$ and 91 kg steam having a temperature of 300° C.

The coal/gas suspension was introduced at a linear velocity of 65 m/sec. in a first reaction zone.

The reaction temperature in the first reaction zone was 1500° C and the pressure was 40 kg/cm$^2$ absolute.

The residence time of the reactants in the first reaction zone was 4 seconds.

After the coal had been converted, the reaction product was withdrawn from the first reaction zone and introduced into a second reaction zone together with 116 kg of the above-mentioned coal and 135 kg steam having a pressure of 50 kg/cm$^2$ absolute and a temperature of 300° C.

In the second reaction zone the reaction product of the first reaction zone reacted with the coal and the steam. The reaction conditions were:

| temperature | 1100° C |
|---|---|
| pressure | 39 kg/cm$^2$ |
| residence time | 6 seconds |

After drying the ultimate product gas mixture had the following composition:

|     | % vol |
| --- | --- |
| CO | 62.5 |
| H$_2$ | 33.8 |
| CO$_2$ | 1.2 |
| CH$_4$ | 1.3 |
| N$_2$+A | 0.9 |
| H$_2$S | 0.3 |

EXAMPLE II

This test was run for comparison with the results of the test of Example I which exemplifies the process recited in the claims of the application using a solid carbonaceous fuel, specifically powdered coal, 70% of which could pass through a sieve of 200 mesh.

In this comparative test, using a computer simulation based upon actual experimentally-determined parameters, a feedstock of a coal/oil-slurry (50% wt. coal/50% wt. Bunker-C-fuel) was used having the following composition:

|     | % wt. |
| --- | --- |
| C | 79.1 |
| H | 8.2 |
| O | 4.5 |
| S | 2.2 |
| N | 1.0 |
| ash | 5.0 |

This slurry contained 66.9 volatile components and 1.3% wt. water. The coal had been ground to a powder, 70% of which could pass a sieve of 200 mesh, 950 kg of the slurry were mixed with 909 kg of an oxidizing gas-containing 98.9% wt. O$_2$ and 73 kg steam having a temperature of 300° C.

The slurry/gas suspension was introduced at a linear velocity of 65 m/sec. in a first reaction zone.

The reaction temperature in the first reaction zone was 1500° C and the pressure was 40 kg/cm$^2$ absolute. The residence time of the reactants in the first reaction zone was 4 seconds.

After the slurry had been converted, the reaction product was withdrawn from the first reaction zone and introduced into a second reaction zone together with 118 kg of the above-mentioned slurry and 147 kg steam having a pressure of 50 kg/cm$^2$ absolute and a temperature of 300° C. In the second reaction zone, the reaction product of the first reaction zone reacted with the slurry and the steam. The reaction conditions were:

| temperature | 1100° C |
| --- | --- |
| pressure | 39 kg/cm$^2$ |
| residence time | 6 seconds |

After drying the ultimate product gas mixture had the following composition:

|     | % vol. |
| --- | --- |
| CO | 55.8 |
| H$_2$ | 40.2 |
| CO$_2$ | 1.0 |
| CH$_4$ | 1.9 |
| N$_2$+A | 0.5 |
| H$_2$S | 0.6 |

During the conversion, described in Example II, of the coal/oil-slurry into gas, 1.5 wt. % soot and 0.5% wt. char on fuel was generated. Yet, during the production of gas from non-slurried coal in accordance with the test of Example I, no soot and only 1% wt. char on coal was formed as a by-product. Soot is difficult to remove from the gas produced, whereas char can easily be separated from the gas with the aid of a cyclone and thus a special advantage of this invention is achieved.

EXAMPLE III

As a feedstock coal was used having the following composition:

|     | % wt. |
| --- | --- |
| C | 73.7 |
| H | 5.1 |
| O | 8.8 |
| S | 0.9 |
| N | 1.6 |
| ash | 9.9 |

This coal contained 33.8% wt. volatile components and 2.6% wt. water. It was ground to a powder, 70% of which could pass a sieve of 200 mesh.

1144 kg of the coal were mixed with 857 kg of an oxidizing gas containing 98.9% wt O$_2$ and 91 kg steam having a temperature of 300° C.

The coal/gas suspension was introduced at a linear velocity of 65 m/sec. in a first reaction zone.

The reaction temperature in the first reaction zone was 1500° C and the pressure was 40 kg/cm$^2$ absolute.

The residence time of the reactants in the first reaction zone was 1 second.

After the coal had been partly converted, the reaction product was withdrawn from the first reaction zone and introduced into a second reaction zone together with 135 kg steam having a pressure of 50 kg/cm$^2$ absolute and a temperature of 300° C.

In the second reaction zone the reaction product of the first reaction zone reacted with the steam. The reaction conditions were:

| temperature | 1100° C |
| --- | --- |
| pressure | 39 kg/cm$^2$ |
| residence time | 16 seconds |

After drying the ultimate product gas mixture had the following composition:

|     | % vol. |
| --- | --- |
| CO | 62.5 |
| H$_2$ | 33.8 |
| CO$_2$ | 1.2 |
| CH$_4$ | 1.3 |
| N$_2$+A | 0.9 |
| H$_2$S | 0.3 |

We claim as our invention:

1. A process for the production of a hydrogen and carbon monoxide-containing gas by partial combustion of a non-slurried solid carbonaceous fuel with an oxidant gas which comprises the steps of:
    a. preheating the oxidant gas, being air or oxygen diluted with steam, carbon dioxide, nitrogen, oxygen, or mixtures thereof, to a temperature of from 200° to 1300° C;
    b. mixing the preheated oxidant gas with the unslurried solid carbonaceous fuel having a partial size such that 70% is smaller than 200 mesh in proportions such that the atomic ratio of oxygen to total carbon in the fuel is from about 0.9 to about 1.4;

c. injecting the mixture into a first reaction zone at a linear velocity of from 10 to 200 m/sec;

d. passing the mixture through the first reaction zone, maintained at a temperature of from 1200° to 1700° C and a pressure of from 1 to 200 kg/cm$^2$, absolute, with a residence time of from 0.02 to 20 seconds to convert from about 70 to about 90% of the fuel to a partial combustion product made up principally of hydrogen and carbon monoxide;

e. passing the combustion product from the first zone through a second reaction zone, maintained at an average temperature at least 100° C lower than that of the first zone and at a pressure up to 200 kg/cm$^2$, absolute, with a residence time of from 0.5 to 40 seconds wherein the remaining solid carbonaceous fuel is substantially completely converted to a partial combustion reaction product made up principally of hydrogen and carbon monoxide without formation of soot.

* * * * *